Mar. 3, 1925.

W. E. HORSMAN ET AL 1,528,548

GANG CULTIVATOR

Filed May 6, 1921

Inventor
W. E. Horsman.
W. B. Billups.

By Geo. F. Kimmel. Attorney

Patented Mar. 3, 1925.

1,528,548

UNITED STATES PATENT OFFICE.

WILLIAM E. HORSMAN AND WARREN B. BILLUPS, OF MONTICELLO, MISSOURI.

GANG CULTIVATOR.

Application filed May 6, 1921. Serial No. 467,340.

*To all whom it may concern:*

Be it known that we, WILLIAM E. HORSMAN and WARREN B. BILLUPS, citizens of the United States, residing at Monticello, in the county of Lewis and State of Missouri, have invented certain new and useful Improvements in Gang Cultivators, of which the following is a specification.

This invention relates to gang cultivators and like implements, and has for one of its objects to improve the construction and increase the efficiency and utility of devices of this character.

Another object of the invention is to produce a device of this character including a plurality of cultivator teeth or shovel carrying standards and with means for simultaneously adjusting all of said standards by the operation of single shift device.

Another object of the invention is to produce a device of this character having means for individually adjusting the cultivator teeth carrying standards, and then simultaneously adjusting all of the standards by the operation of a single shifting device.

With these and other objects in view the invention consists of certain novel features of construction as hereinafter shown and described and then specifically pointed out in the claims, and in the drawings illustrative of the preferred embodiment of the invention.

The improved device comprises a supporting frame composed of a plurality of bars or beams 10 converged at one end and coupled by a plurality of bolts 11 to a clevis device 12 to which the draft appliance is adapted to be coupled.

Figure 1:
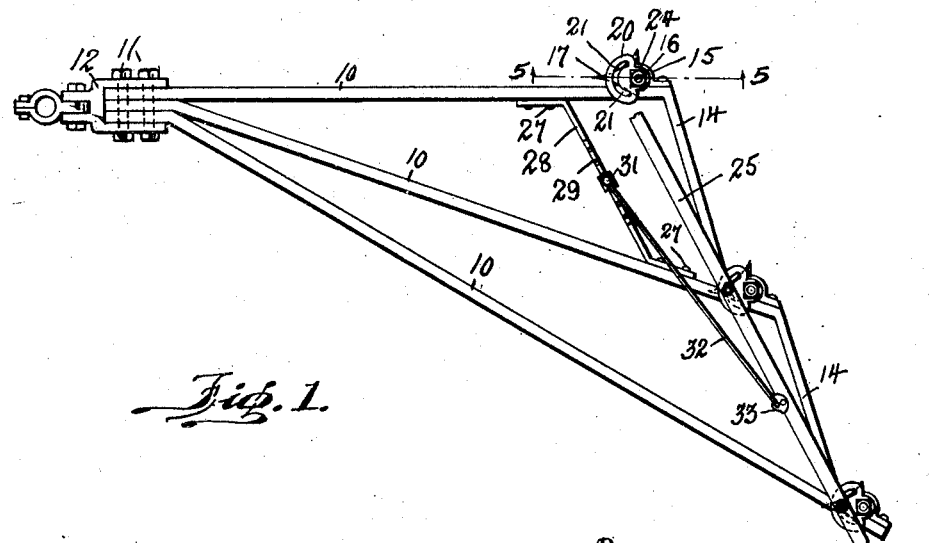
Figure 1 is a plan view of the improved device.
Figure 2:
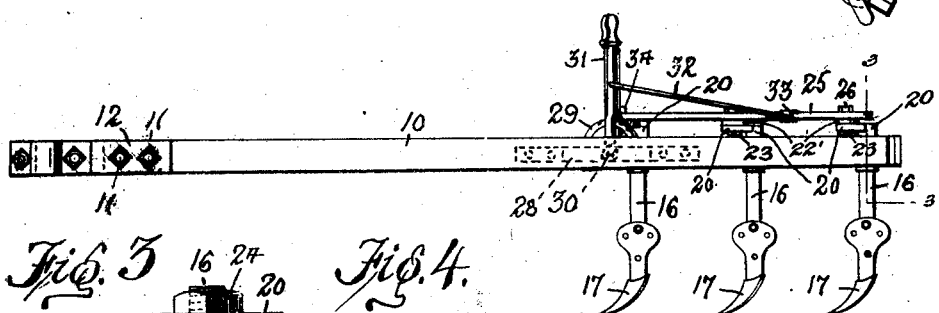
Fig. 2 is a side elevation.

At their rear ends two of the beams are offset laterally as shown at 14, and coupled to the other beams to firmly unite them to form a rigid angular frame, as shown in Fig. 1.

Attached to each of the bars 10 at its rear end is a bearing 15, and supported for rotation in each bearing is a standard 16, each standard carrying a cultivator tooth or shovel 17 at its lower end.

The upper end of each of the standards 16 is square or of other form than round, as shown at 18, and slightly tapered, and engaging each of these irregular portions is a plate or head member 20 having a segmental slot 21 and with a pivot pin 22 adjustably supported in each slot by a clamp nut 23. Each pivot pin has a stop collar 22' intermediate the ends and bearing upon the upper face of the member 20, the lower face of the collar 22' being serrated to engage corresponding serrations 35 in the upper face of the member 20. By this means the pin 22 may be firmly locked in the slot 21 of the member 20 to hold the shovel 17 in adjusted position.

Each of the members 20 is firmly secured to its respective standard by a clamp nut 24 as shown, and thus rotates with the standards.

By tapering the upper end 18 of the standard and correspondingly tapering the hub portion of the member 20, the member 20 may be very tightly coupled to the standard, and in event of the wearing of the parts such wear can be quickly taken up and the tightness maintained by simply tightening the clamp nut 24, as will be obvious.

Extending over the collar 22' is a shifting bar 25, the latter having openings to loosely receive the upper parts of the pins 22 and secured thereto by clamp nuts 26.

By this means the pins 22 are independently adjustable in the slots 21 to correspondingly adjust the position of the shovels or teeth 17 and then all of the teeth simultaneously adjusted by motion applied to the single shifting member 25.

Figures 3, 4:
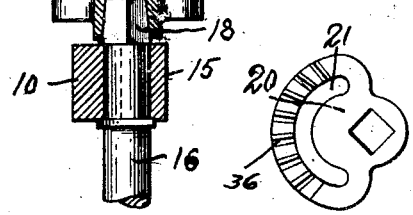
Fig. 3 is an enlarged sectional detail of the coupling between one of the teeth carrying standards and the supporting frame, on the line 3—3 of Fig. 2.
Fig. 4 is an enlarged plan view of one of the segmentally slotted head members.
Figure 6:
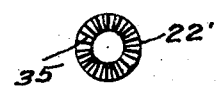
Fig. 6 is a detached view of the serrated lock washer.
Figure 5:
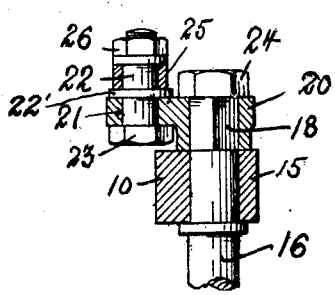
Fig. 5 is an enlarged sectional detail on the line 5—5 of Fig. 1.

The coacting bearing faces of the members 22' and 25 are correspondingly roughened or corrugated, as represented at 35 and 36 in Figs. 4 and 6, to enable the parts to be firmly clamped together and slipping obviated.

Coupled at its ends at 27 to one pair of the bars 10 is a support 28 having a toothed segment 29 rising therefrom.

Pivoted to the member 28—29 as indicated at 30 is a shifter lever 31 coupled by a rod 32 to a clip device 33 fast to the bar 25.

A pawl device 34 is coupled to the lever 31 and cooperates with the teeth of the segment 29, to hold the lever 31 in adjusted position.

By this simple means the bar 25 may be adjusted to any extent within the range of movement of the lever 31, and thus correspondingly and simultaneously adjust the standards and the teeth or shovels carried thereby.

Previous to the adjustment of the shovel standard by the link bar 25, as above described, the nuts 26 are loosened until the corrugations or teeth 35 and 36 are disconnected, to release the member 25, and then after the adjustments are completed, the nuts 26 are again set up to hold the adjustments.

By this simple means also the shovels or teeth 17 may be independently "set" to any required extent, and then all the teeth so "set" simultaneously adjusted to uniformly control their movement through the soil.

The improved device is simple in construction, can be manufactured of metal or partly of metal and partly of wood, and of any required size or capacity.

The preferred embodiment of the invention is disclosed in the drawings and set forth in the specification, but it will be understood that any modification within the scope of the claimed invention may be made in the construction without departing from the principle of the invention or sacrificing any of its advantages.

What we claim is:—

1. In a gang cultivator, a supporting frame, a plurality of standards rotative in said frame and each carrying a cultivator shovel at the lower end, a head member attached to the upper end of each standard and each formed with a segmental slot, an operating rod, coupling devices adjustably connecting said rod respectively with said segmental slots, an operating lever swinging upon said frame, and a link connecting said lever to said operating rod.

2. In a gang cultivator, a supporting frame, a plurality of standards rotative in said frame, and each carrying a cultivator shovel at the lower end, a head member attached to the upper end of each standard and each formed with a segmental slot with the material of the head member serrated adjacent the slot, a serrated washer engaging the serrations of the head member, a pin extending through each of said slots and the adjacent washer, an operating rod having spaced apertures to receive said pins, a clamp nut engaging each of said pins and operating to adjustably clamp the rod to the head members, an operating lever swinging upon said frame, and a link connecting said lever to said operating rod.

In testimony whereof we affix our signatures hereto.

WILLIAM E. HORSMAN.
WARREN B. BILLUPS.